United States Patent
Pasquero et al.

(10) Patent No.: US 9,239,631 B2
(45) Date of Patent: Jan. 19, 2016

(54) KEYBOARD INPUT CONTROL METHOD AND SYSTEM

(75) Inventors: Jerome Pasquero, Montreal (CA); Donald Somerset McCulloch McKenzie, Waterloo (CA); Jason Tyler Griffin, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/564,312

(22) Filed: Aug. 1, 2012

(65) Prior Publication Data

US 2013/0222250 A1    Aug. 29, 2013

Related U.S. Application Data

(63) Continuation of application No. 13/490,255, filed on Jun. 6, 2012.

(60) Provisional application No. 61/603,323, filed on Feb. 26, 2012.

(51) Int. Cl.
*G06F 3/02* (2006.01)
*G06F 3/023* (2006.01)
*G06F 17/27* (2006.01)
*G06F 3/0488* (2013.01)

(52) U.S. Cl.
CPC .......... *G06F 3/0237* (2013.01); *G06F 3/04886* (2013.01); *G06F 17/276* (2013.01)

(58) Field of Classification Search
CPC ..... G06F 3/023; G06F 3/0238; G06F 3/0237; G06F 17/276; G06F 3/027; G06F 3/04886; G06F 3/0489; G06F 15/02; G06F 15/0225; G06F 1/1666

USPC .................................................. 345/156–172
See application file for complete search history.

(56) References Cited

U.S. PATENT DOCUMENTS

| | | | | |
|---|---|---|---|---|
| 5,861,823 | A | * | 1/1999 | Strauch et al. .................. 341/22 |
| 6,847,706 | B2 | * | 1/2005 | Bozorgui-Nesbat .. G06F 3/0233 345/172 |
| 8,666,444 | B2 | * | 3/2014 | Mahalingam ......... G06F 3/0233 379/433.07 |
| 2002/0077143 | A1 | * | 6/2002 | Sharif et al. .................. 455/550 |

(Continued)

OTHER PUBLICATIONS

European search report dated Mar. 5, 2013, issued in European Application No. 12171055.2, 7 pages.

(Continued)

*Primary Examiner* — Rodney Amadiz
(74) *Attorney, Agent, or Firm* — Fish & Richardson P.C.

(57) ABSTRACT

A method for processing input from a keyboard of a handheld computing device includes receiving a plurality of key input events and, from the plurality of key input events, determining whether there is a double selection event corresponding to a specified key from the keyboard. Further, the method includes, when it is determined that there is the double selection event corresponding to the specified key, determining a key selection offset between a first and second key selection action of the double selection. The method also includes deciding whether the key selection offset is substantially equal to or greater than a predetermined threshold and, when it is decided that the key selection offset is substantially equal to or greater than the predetermined threshold, using at least a first key as key input of the double selection event. The first key and the specified key are different.

13 Claims, 4 Drawing Sheets

(56) References Cited

U.S. PATENT DOCUMENTS

| | | |
|---|---|---|
| 2003/0193478 A1* | 10/2003 | Ng et al. .................. 345/168 |
| 2005/0140653 A1 | 6/2005 | Pletikosa et al. |
| 2006/0146026 A1* | 7/2006 | Shim .................. H01H 13/70 345/168 |
| 2007/0120828 A1* | 5/2007 | Fyke ........................ 345/169 |
| 2007/0182595 A1* | 8/2007 | Ghasabian .................. 341/22 |
| 2008/0062126 A1* | 3/2008 | Algreatly .............. G06F 3/02 345/157 |
| 2008/0115054 A1 | 5/2008 | Scott |
| 2010/0097403 A1* | 4/2010 | Willey ...................... 345/689 |
| 2010/0265200 A1* | 10/2010 | Cho .................. G06F 3/0418 345/173 |
| 2011/0007004 A1 | 1/2011 | Huang et al. |
| 2011/0307822 A1 | 12/2011 | Park et al. |
| 2013/0222248 A1 | 8/2013 | Pasquero et al. |

OTHER PUBLICATIONS

Canadian Office Action in Canadian Application No. 2,807,658, dated Feb. 3, 2015, 5 pages.
United States Office Action in U.S. Appl. No. 13/490,225, dated Apr. 9, 2015, 26 pages.

\* cited by examiner

KEYBOARD INPUT CONTROL METHOD AND SYSTEM

This application is a continuation of U.S. application Ser. No. 13/490,255, filed Jun. 6, 2012, and claims the benefit of priority from U.S. application Ser. No. 13/490,255 and U.S. Provisional Application No. 61/603,323, filed Feb. 26, 2012, both of which are incorporated herein by reference.

BACKGROUND

The present invention generally relates to hand-held computing device technologies and, more particularly, to the methods and systems for input control and management.

Smart phones and other hand-held computing devices integrate many functions into a single device. For example, a modern hand-held computing device often provides two-way, full text messaging to its user and permits the user to initiate messages and to respond to messages in a timely fashion and with text entirely created by the user. In order to keep the form factor of the hand-held computing device small enough to be worn on the body of the user, such as with a belt clip or in a pocket, the input device (e.g., a keyboard) of the hand-held computing device is generally configured to be small, to have a minimal number of keys, and to be optimized for using a minimal number of key strokes.

Further, the hand-held computing device also permits a user to enter a variety of types of data into the hand-held computing device, such as an address book, a calendar, a task list, an email message or a similar text file that requires user-generated or input data. Thus, although the keyboard only has a minimal number of keys, the keyboard needs to be configured with the keys representing the alphabet generally placed in the same order as they would appear on a standard keyboard, such as the QWERTY keyboard.

These competing requirements may cause inconveniences or difficulties for the user to input data into the hand-held computing device. The disclosed methods and systems are directed to solve the problems set forth above and other problems.

BRIEF SUMMARY OF THE DISCLOSURE

One aspect of the present disclosure includes a method for processing input from a keyboard of a hand-held computing device. The method comprises receiving a plurality of key input events and, from the plurality of key input events, determining whether there is a double selection event corresponding to a particular key from the keyboard, such as the space bar key. The double selection event includes a first key selection action and a second key selection action. Further, the method also includes, when it is determined that a double selection event has occurred, determining a key selection offset between the first key selection action and the second key selection action. The method also includes deciding whether the key selection offset is substantially equal to or greater than a predetermined threshold and, when it is decided that the key selection offset is substantially equal to or greater than the predetermined threshold, using at least a first key as key input of the double selection event. A key input is then reflected by the output apparatus, such as a display, of the hand-held computing device. In addition, the method includes, when it is decided that the key selection offset is less than the predetermined threshold, using at least a second key as the key input of the double selection event.

Another aspect of the present disclosure includes a hand-held computing device. The device includes a wireless communication module, a memory module, a keyboard, and a processor. The processor is coupled to the memory module, the wireless communication module, and the keyboard. Further, the processor is configured to receive a plurality of key input events and to determine whether, from the plurality of key input events, there is a double selection event corresponding to a specified key from the keyboard, such as the space bar key. The double selection includes a first key selection action and a second key selection action. Further, the processor is configured to, when there is the double selection event corresponding to the specified key, determine a key selection offset between the first key selection action and the second key selection action. The processor is also configured to decide whether the key selection offset is substantially equal to or greater than a predetermined threshold and, when the key selection offset is substantially equal to or greater than the predetermined threshold, to use at least a first key as key input of the double selection event. In addition, the processor is configured to, when the key selection offset is less than the predetermined threshold, use at least a second key as the key input of the double selection event.

Other aspects of the present disclosure can be understood by those skilled in the art in light of the description, the claims, and the drawings of the present disclosure.

DETAILED DESCRIPTION

Reference will now be made in detail to example embodiments of the invention, which are illustrated in the accompanying drawings.

Figure 1:
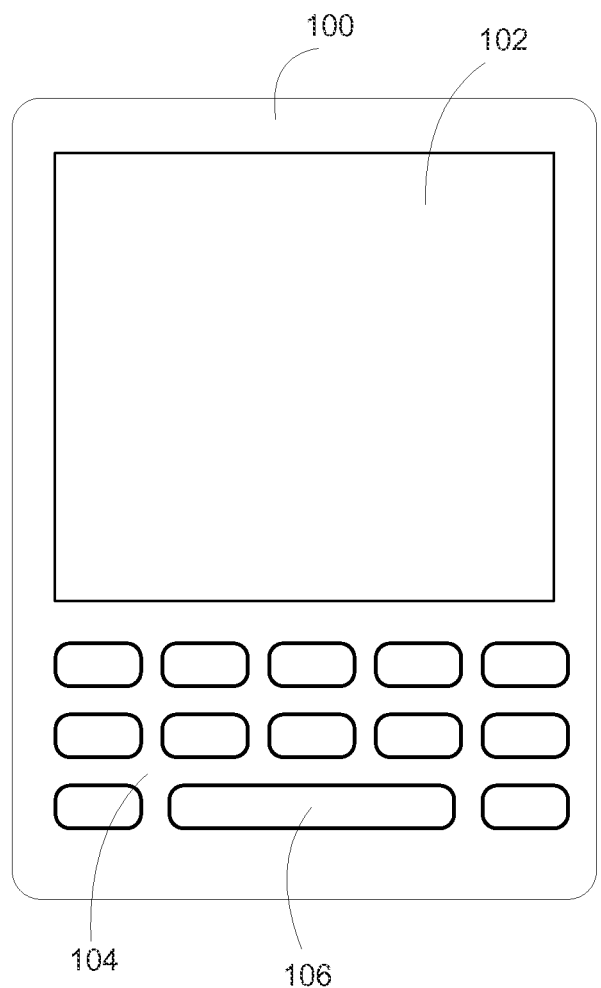
FIG. 1 illustrates an example hand-held computing device consistent with the disclosed embodiments.

FIG. 1 illustrates an example hand-held computing device 100 according to certain aspects of the disclosed embodiments. As shown in FIG. 1, hand-held computing device 100 includes a display screen 102 and a keyboard 104. In some configurations, hand-held computing device 100 includes other input devices and components, including, for example, on-off switches configured to turn the device on and off or to initiate the on/off operation, volume control switches configured to receive user input to increase or decrease the device volume or to initiate the volume increase/decrease operation, ringer control switches, and cursor navigation components, such as an optical navigation component or track wheel.

In one configuration, hand-held computing device 100 is a computing device for mobile computing. For example, hand-held computing device 100 is a mobile phone, a smart phone, a tablet computer, a personal digital assistant (PDA), or other type of mobile device.

Display screen 102 includes, for example, an appropriate type of device for displaying information of hand-held computing device 100. For example, display screen 102 includes a liquid crystal display (LCD) device, a light emitting diode (LED) display device, or other text or graphic display device. Display screen 102 also includes, for example, a touch screen device configured for receiving and/or processing user input alone or in combination with other device components such as a processor. Further, keyboard 104 includes a plurality keys configured for hand-held computing applications. More particularly, keyboard 104 includes a plurality of character keys (not labeled), certain specialized keys (not labeled), and a spacebar 106.

Specialized keys include, for example, an "alt" key, a "caps" key, a line feed key, a backspace key, and/or other keys. Further, other auxiliary input devices are also included in the configuration of keyboard 104, such as the thumbwheel or optical navigation component explained above. The thumbwheel or optical navigation component is used to generate respective signals to facilitate key input control. The thumbwheel or optical navigation component can also be configured to be pushed toward the rear direction to generate an additional input signal to improve key input operations.

A user inputs data by selection individual keys on the keyboard in conjunction with software in hand-held computing device 100. In some configurations, the user inputs data by selection a combination of keys. For example, the user may select a key having a predefined functional state (for example the "caps" key) and then select another key on keyboard 104 (for example, the key for the character "a") to input a combination with additional meaning separate from individual keys on keyboard 104 (for example, the combination of selecting the "caps" key followed by the "a" key results in inputting the upper case "A").

Figure 2:
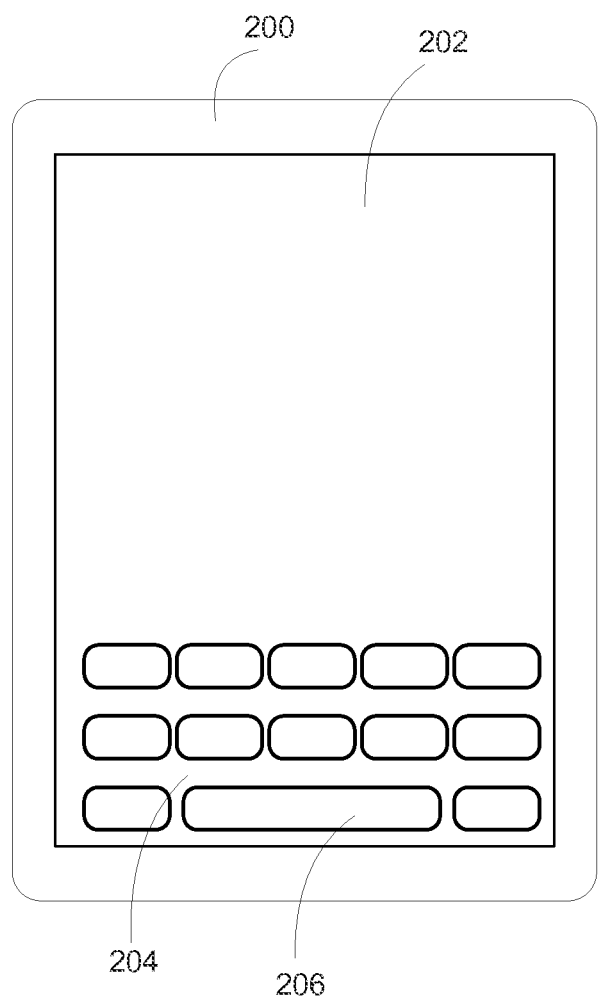
FIG. 2 illustrates another example hand-held computing device consistent with the disclosed embodiments.

Keyboard 104 is a physical keyboard in that actual keys are configured on hand-held computing device 100 to be selected by the user. However, as explained, other types of keyboards such as a virtual keyboard are used in conjunction with touch screen display configurations. FIG. 2 illustrates an example hand-held computing device 200 configured with such a virtual keyboard.

As shown in FIG. 2, hand-held computing device 200 includes a touch screen 202, in addition to other devices and components (not shown). In this configuration, a virtual keyboard is provided on touch screen 202.

Hand-held computing device 200 is similar to hand-held computing device 100. Computing device 200 is configured for mobile computing, such as a mobile phone, a smart phone, a tablet computer, a PDA, or other type of mobile device. Touch screen 202 includes, for example, a touch screen device for displaying information to a user of hand-held computing device 200 and for the user to input information into hand-held computing device 200.

For example, touch screen 202 includes a touch-detection device in combination with an LCD device, an LED display device, or other graphic display device. To facilitate user input, software in hand-held computing device 200 generates keyboard 204 displayed on touch screen 202 such that the user can use the generated keyboard 204 to input data. Keyboard 204 is similar to keyboard 104 or it may be a keyboard in different format. A spacebar 206 and other types of keys (not labeled) are also configured in keyboard 204.

Figure 3:
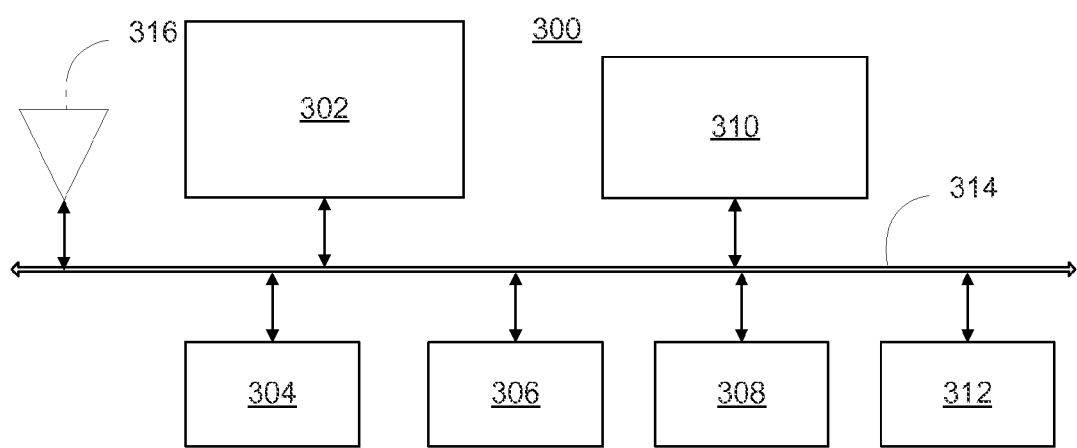
FIG. 3 illustrates a block diagram of an example hand-held computing device consistent with the disclosed embodiments.

Hand-held computing device 100 and hand-held computing device 200 are implemented by a processor-based hardware and software platform. FIG. 3 illustrates a block diagram of an exemplary hand-held computing device 300 (i.e., hand-held computing device 100 and/or hand-held computing device 200).

As shown in FIG. 3, in one configuration hand-held computing device 300 includes a processor 302, a memory module 304, a communication module 306, a display 308, an input and output module 310, a sensor module 312, and a wireless module 316. In some configurations some component(s) are omitted and other devices are added without departing the principles of the disclosed embodiments. Further, a bus module 314 or other interconnecting unit connects the various devices and components.

Processor 302 includes a graphic processing unit (GPU), general-purpose microprocessor, digital signal processor (DSP) or microcontroller, and application specific integrated circuit (ASIC), etc. In some configurations, processor 302 also includes co-processor or co-processors for handling specific processing tasks, such as graphic processing and security processing, etc. Processor 302 executes sequences of computer program instructions to perform various processes associated with hand-held computing device 300, such as key input control, editing, and display processes.

Memory module 304 includes memory units used by processor 302 and other components. For example, memory module 304 includes one or more read-only memory (ROM) units, random access memory (RAM) units, FLASH memory units, and other storage medium units, such as flash disk and memory card, etc. The computer program instructions are loaded into RAM units for execution by processor 302 from ROM units or FLASH memory units.

Communication module 306 provides communication connections such that hand-held computing device 300 communicates remotely with other systems through communication networks via various communication protocols, such as TCP/IP, hyper text transfer protocol (HTTP), etc. Display 308 includes any appropriate display devices (e.g., display screen 102, touch screen 202) for displaying information to the user of hand-held computing device 300.

Further, input and output module 310 provides for the user to input information into hand-held computing device 300 or for the user to receive information from hand-held computing device 300. For example, input and output module 310 includes any appropriate input device, such as a keyboard or a keypad, a mouse, a microphone, a video camera or webcam, a remote control, a scanner, voice communication devices, or any other optical or wireless input devices. In some configurations, input and output module 310 also includes any appropriate output device, such as a speaker or any other output device.

Sensor module 312 includes any appropriate sensor units to provide various sensing signals to hand-held computing device 300 to enable certain functionalities, such as touch screen operations, keyboard operations, and orientation-based display operations. Sensors an detect various device conditions, including movement of the device, a change in device orientation, and acceleration.

Further, wireless module 316 enables short-range and/or long range wireless communication for hand-held computing device 300 to communicate with other devices wirelessly via various wireless communication protocols and standards, such as Bluetooth, WiFi, GSM, 3G, and 4G. In addition, bus module 314 includes one or more buses to interconnect various processor(s) and other modules for exchanging data and control signals.

Figure 4:
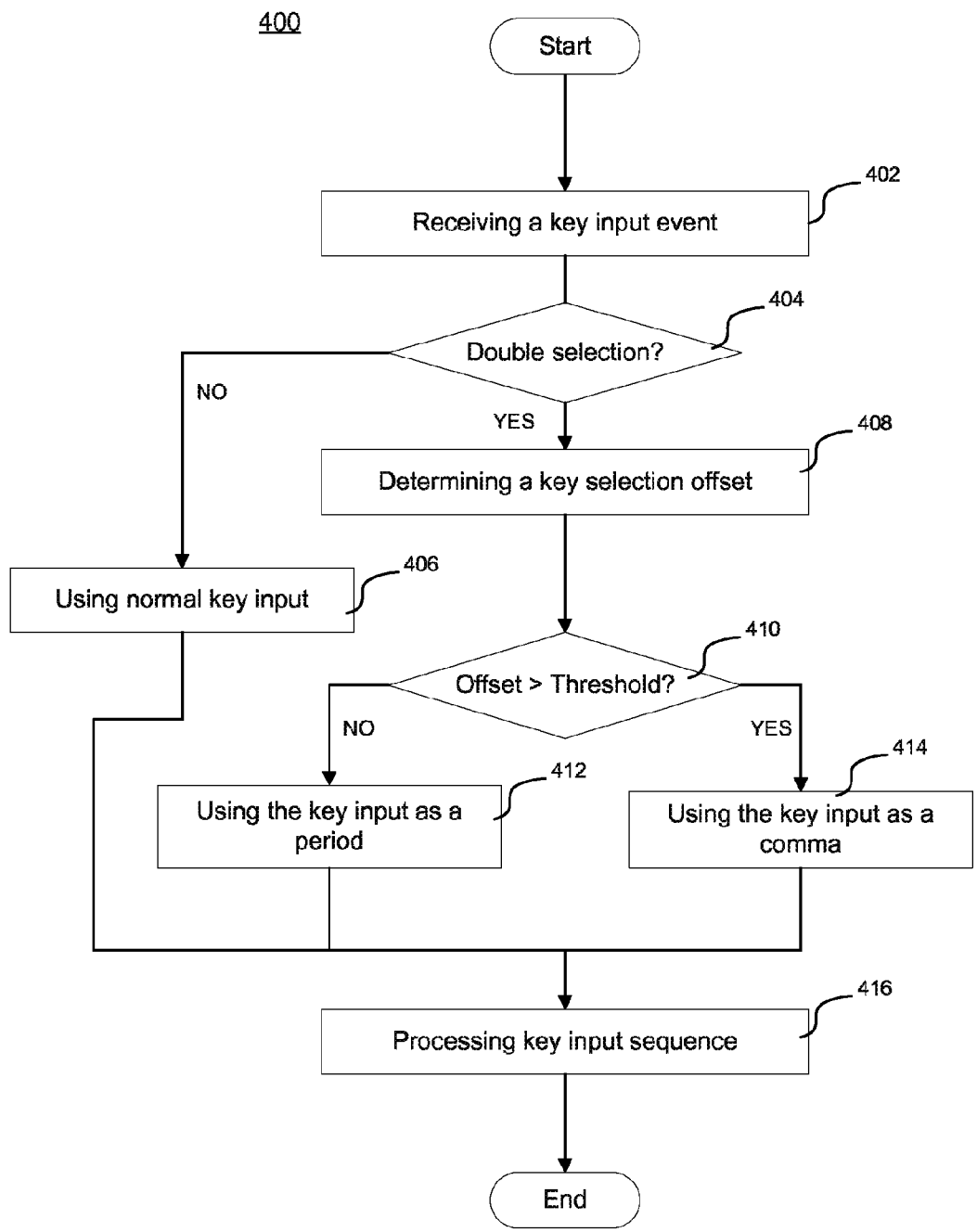
FIG. 4 illustrates an example key input control process consistent with the disclosed embodiments.

In operation, hand-held computing device 300 or, more particularly, processor 302 of hand-held computing device 300 performs certain processes to facilitate a user of hand-held computing device 300 to input data via a keyboard or a keypad (e.g., 104/204). Processor 302 is configured to receive the inputted data, to edit/format the inputted data, and to display the formatted data to the user. FIG. 4 illustrates an exemplary key input control process 400 performed by processor 302.

As shown in FIG. 4, at the beginning of process 400, processor 302 receives a key input event (402). When the user selects any key on hand-held computing device 300, processor 302 receives or detects a key input event containing parameters of the particular key and/or the particular key combination. The parameters indicate a key or a combination of keys selected and other information associated with the key or the combination of keys, such as the identification, key selecting time or time stamp, orientation, direction, and/or sequence of the selected key or combination of keys. Other information may also be included.

The key event is a part of a set of key input events. The set of key input events correspond to multiple key selection actions by a user as a key input sequence. Processor 302 receives the set of key input events in sequence or as a set from the keyboard or keypad device. In certain embodiments, after receiving a key event, processor 302 causes a symbol or character corresponding to the key input event being injected or displayed in a text field related to the key input sequence.

After receiving the key input event (402), processor 302 determines whether there is a double selection event corresponding to a specified key based on the key input event and the previous key input events (404). The term "double selection," as used herein, refers to a sequential action of selecting a particular key (on a physical or virtual keyword) twice within a predetermined time period, such as, a first selection action followed by a second selection action within a preset time period. The predetermined time period is preset on system configuration, set by processor 302 using pre-configured parameters or default parameters, or set by a user in connection with a device configuration operation. Further, the predetermined time period is be set to a desired value such that ordinarily selecting the key twice does not trigger the double selection event. Alternatively, the term "double selection" simply means that a same key is selected twice sequentially without any particular time constraint, i.e., the key is the same for the key input event and the previous key input event.

The double selection event corresponds to a specified key or keys. That is, only double selection event of a specified key or keys is specially processed by processor 302. If a double selection event of an unspecified key occurs, processor 302 ignores the double selection event and processes the key input as normal.

Further, the specified key is automatically determined by processor 302 or it may be set by the user. In certain embodiments, the specified key is a spacebar key. In other words, processor 302 determines whether a spacebar double selection event happens. Other keys may also be used.

When a time constraint is set for the double selection event, processor 302 determines the time difference between two sequential actions of key selection based on certain information. For example, processor 302 receives the time difference information directly from an input device (e.g., a keyboard or keypad) or processor 302 receives individual time information, such as a time stamp, associated with each key selection action and calculates the time difference based on received time information of each key selection action.

If the time difference is within the predetermined time period, processor 302 determines that the double selection event happened; otherwise processor 302 determines that the double selection event did not occur. Of course, if time constraint is not required, processor 302 determines the double selection event without calculating the time difference. In other words, in some example embodiments there is no maximum time between two selection events.

Processor 302 also uses different parameters for different types of keyboards. For example, for a physical keyboard (e.g., keyboard 104 in FIG. 1), information associated with actual key selection actions may be used by processor 302 to determine the double selection event. On the other hand, for a virtual keyboard on a touch screen (e.g., keyboard 204 in FIG. 2), information associated with screen touching actions are used by processor 302 to determine the double selection event. That is, a key selection action includes a key touching action (such as receiving a touch on the key) when the keyboard or keypad is displayed on a touch screen. Thus, in the touch screen configuration, the first key selection action and the second key selection action are referred as the first key touching action and the second key touching action for a touch screen virtual keyboard. Other parameters may also be used.

If processor 302 determines that the double selection event did not happen (404; NO), processor 302 continues to use normal key input without special processing (406). That is, processor 302 obtains all information associated with actual key input without special processing with respect to the specified key. In other words, actual key character corresponding to the key input event is entered into text or other data structures without modification.

On the other hand, if processor 302 determines that the double selection event for the specified key did happen (404; YES), processor 302 further determines double selection location information of the specified key (408). That is, processor 302 determines the location or vicinity difference between the point of first key selection action and the point of second key selection action, which is also called a key selection offset.

Processor 302 determines the key selection offset between two points of key selection actions, i.e., double selection, based on various ways. For example, processor 302 receives the key selection offset information directly from the input device (e.g., a keyboard or keypad). Processor 302 also receives location information of individual key selection actions and calculates the key selection offset based on the received location information of individual key selection actions. For example, processor 302 receives location information indicating that the first key selection action is on the left of the spacebar 106 (i.e., the specified key) and the second key selection action is on the right of the spacebar 106. Thus, processor 302 calculates the key selection offset as the length of the spacebar 106.

Alternatively, the key selection offset may be a Boolean value of '0' or '1', i.e., either with an offset or without an offset. For example, if the first key selection action is on the left of the spacebar 106 and the second key selection action is also on the left of the spacebar 106, i.e., the points of the first and second key selection actions are on the same side, the key selection offset is set to '0' or 'false'. If the first key selection action is on the left or right of the spacebar 106 and the second key selection action is on the different side (right or left) of the spacebar 106, the offset is set to '1' or 'true'.

Processor 302 also receives location information indicating a coordinate of the first key touching point of spacebar 206 and a coordinate of the second key touching point of spacebar 206 in a touch screen keyboard. Processor 302 calculates the key selection offset as the distance between two coordinates using the two coordinates. Other methods may also be used.

Further, processor 302 decides whether the key selection offset is substantially equal to or greater than a predetermined threshold (410). The threshold is set by processor 302 based on configuration parameters or default parameters or it is set by the user during operation. After comparing the key selection offset with the threshold, if processor 302 decides that the key selection offset is not substantially equal to or greater than the predetermined threshold (410; NO), processor 302 uses the key input as a period (412), i.e., the punctuation '.' (period). Optionally, processor 302 also uses the key input as a period followed by a space or two spaces. Because spacebar key and the period key often are not configured as keys at a same level, such key transformation may substantially improve the user's typing experience.

On the other hand, if processor 302 decides that the key selection offset is greater than or equal to the predetermined threshold (410; YES), processor 302 uses the key input as a comma (414), i.e., the punctuation ',' (comma). Optionally, processor 302 also uses the key input as a comma followed by a space. Also, because spacebar key and the comma key often are not configured as keys at a same level, such key transformation may substantially improve the user's typing experience. Further, by combining the period key replacement and the comma key replacement into a single specified key with different key selection actions, user convenience of typing texts may be substantially increased.

Further, processor 302 processes the key input sequence (416). Processor 302 processes the key input sequence based on determination of the type and contents of the key input. As mentioned above, processor 302 modifies the key input sequence based on the double selection and the key selection offset. For example, if a key input sequence is a letter character key (denoted as <character>) followed by two other letter keys <character1> and <character2>, there is no double selection event and processor 302 may process the key input sequence as the actual characters of the selected keys:

<character><character1><character2>.

If a key input sequence is a <character> followed by the double selection of the spacebar (denoted as <space>), the key input sequence corresponds to <character><space><space>. However, when processor 302 determines that there is the double selection event and also determines that the key selection offset is not greater than the predetermined threshold, processor 302 modifies the input sequence of <character><space><space> to

<character><period><space> or simply

<character><period>.

On the other hand, when processor 302 determines that there is the double selection event and also determines that the offset is greater than or equal to the predetermined threshold, processor 302 modifies the input sequence of <character><space><space> to

<character><comma><space> or simply

<character><comma>.

When processing the input sequence, at the input level, processor 302 processes key input events one at a time. For example, for the input sequence of <character><space><space>, processor 302 receives, in a sequence, a first key event <character>, a second key event <space>, and a third key event <space>, and processed the three key events on at a time.

After receiving the first key event <character>, processor 302 outputs the <character> for display in the text field. Similarly, after receiving the second key event <space>, processor 302 outputs the <space> into the text field after <character>. Further, after receiving the third key event <space>, if processor 302 determines that it is a double selection with an offset (e.g., the offset is greater than or equal to the predetermined threshold), processor 302 removes the previous <space> and outputs a <comma> followed by a <space> in the text field. Processor 302 removes the previous <space> by, for example, applying a backspace command or some other deletion operation.

On the other hand, if processor 302 determines it is a double selection without an offset (e.g., the offset is less than the predetermined threshold), processor 302 removes the previous <space> and outputs a <period> followed by a <space> in the text field. Further, processor 302 also checks certain conditions before removing the previous <space> and outputting a <comma> followed by a <space> or outputting a <period> followed by a <space>.

For example, the above double selection of <space> only takes effect if the first <space> comes directly after a character. In other words, selecting the <space> 4 times in a row after a string of characters will result in <comma> or <period> followed by <space><space><space>, and not more than one <comma> or <period>. Thus, strings of spaces can be entered without being converted to strings of commas or periods. Other conditions may also be used.

In some embodiments, two selection events occur simultaneously. That is, a key such as the spacebar may be tapped by, for example, two fingers, at the same time. Because the first <space> is not output into the text field, no removing action is needed. The processor 302 simply outputs a <comma> followed by a <space> in the text field, assuming the two simultaneous selections are separate by a sufficient distance. Other actions or characters may also be performed or injected.

After processing the key input sequence, processor 302 also displays the key input sequence to the user, such that the user can see the replacement of the key input (i.e., replacement with <period> and <comma>). The user has the option of canceling the replacement by selecting another key, such as a backspace key. That is, when processor 302 receives the input from the user to cancel the key replacement, processor 302 reverses the modification upon receiving the cancelling key input. Other keys and configurations may also be used.

Alternatively or optionally, processor 302 chooses not to perform the modification or key replacement in real-time as described above, and marks the special key combinations inputted by the user without replacement or modification. For example, processor 302 marks the key input sequence as "double selection without offset" or "double selection with offset." Processor 302 then sends the key input sequence, along with the marking, to text editing software or other application software. The text editing software running on processor 302 performs the modification or key replacement based on the marked special key combinations, such as replacing the input sequence of <character><space><space>*double selection without offset* with <character><period><space> or simply with <character><period> or replacing the input sequence of <character><space><space>*double selection with offset* with <character><comma><space> or simply with <character><comma>. Processor 302 or the text editing software displays the key input sequence to the user such that the user can view the input and may also change or edit the input.

It should be noted that, although the spacebar is used as an example in this disclosure, any specified key may be used. A candidate for a specified key may need to support detection of double selection and offset. The specified key may be configured by processor 302 automatically or may be configured by the user. If the user configures a specified key that does not support detection of double selection or offset, the specified key would be treated as ordinary key without special processing.

Further, <period> and <comma> are also used for illustrative purposes, other characters or special characters may be used, such that desired key input mechanisms can be achieved to facilitate the user to input data using the keyboard or keypad on hand-held computing device 300. For example, instead of replacing the first <space> or both <space> with a period, a period may be inserted after the <character> and the next character entered by the user may be capitalized thereby producing two spaces between the period and the next character.

The disclosed systems and methods may provide many advantageous keyboard or keypad data input applications. For example, key transformation and replacement may be used to provide the user a more convenient key input mechanism to input texts and punctuations. Other applications, improvements, and modifications are obvious to those skilled in the art.

What is claimed is:

1. A method for processing input from a keyboard of a hand-held computing device, comprising:
   receiving a key input event;
   determining that the key input event is a double selection event, wherein the double selection event includes a first key selection action of a specified key of the keyboard at a first time instance and a second key selection action of the specified key of the keyboard at a second time instance, and a time difference between the first time instance of the first key selection action and the second time instance of the second key selection action of the double selection event is within a predetermined time period;
   determining a key selection offset between the first key selection action and the second key selection action based on a first location associated with the first key selection action and a second location associated with the second key selection action, wherein the key selection offset is a distance between the first location and the second location in the double selection event; and
   outputting at least a first punctuation, corresponding to a first key, based on the determination that the key selection offset is substantially equal to or greater than a predetermined threshold, wherein the first key is different from the specified key.

2. The method of claim 1, wherein the specified key reflects a spacebar input and the first key reflects a comma input.

3. The method of claim 2, wherein outputting at least a comma in the double selection event further includes:
   outputting a comma followed by a space instead of two spaces corresponding to the double selection of the spacebar.

4. The method of claim 1, further comprising:
   outputting at least a second punctuation, corresponding to a second key, based on the determination that the key selection offset is less than the predetermined threshold, wherein the second key is different from the specified key and the first key.

5. The method of claim 4, wherein:
   the specified key reflects a spacebar input;
   the first key reflects a comma input; and
   the second key reflects a period input.

6. The method of claim 5, wherein outputting at least a period in the double selection event further includes:
   outputting a period followed by a space instead of two spaces corresponding to the double selection of the spacebar.

7. The method of claim 5, further including:
   marking a key input sequence corresponding to the double selection event as one of double selection without offset and double selection with offset;
   editing the key input sequence marked with double selection without offset to output a period followed by a space corresponding to the double selection of the spacebar; and
   editing the key input sequence marked with double selection with offset to output a comma followed by a space corresponding to the double selection of the spacebar.

8. The method of claim 1, wherein:
   the keyboard is a virtual keyboard on a touch screen;
   the first key selection action is a first key touching action; and
   the second key selection action is a second key touching action.

9. The method of claim 1, wherein determining a key selection offset further includes:
   determining the key selection offset based on a first point of the first key selection action of the specified key of the keyboard at the first time instance and a second point of the second key selection action of the specified key of the keyboard at the second time instance.

10. The method of claim 9, wherein:
    the first key selection action is a first key touching action;
    the second key selection action is a second key touching action; and
    the key selection offset is a distance between two coordinates of the first point and the second point, respectively.

11. The method of claim 1, further comprising:
    receiving a plurality of key input events; and
    outputting key input corresponding to the plurality of key input events, based on a determination that the key input events does not include the double selection event.

12. The method of claim 1, further comprising:
    determining whether the first key selection action of the specified key follows a character key input in the double key selection event; and
    outputting key input corresponding to the specified key, based on a determination that the first key selection action does not follow the character key input.

13. The method of claim 1, further comprising:
    cancelling the outputting of the first punctuation by selecting a cancelling key, the cancelling key different from the first key and the specified key.

* * * * *